United States Patent
Iaconis et al.

(10) Patent No.: US 7,964,313 B2
(45) Date of Patent: Jun. 21, 2011

(54) FUEL CELL DEVICES AND METHOD THEREFOR

(75) Inventors: Jean-Louis Iaconis, Vancouver (CA); Duhane Lam, Vancouver (CA); Robert Johnston, Vancouver (CA)

(73) Assignee: Angstrom Power Incorporated, North Vancouver, British Columbia ( * ) Notice: Subject to any disclaimer, the term of this patent is extended or adjusted under 35 U.S.C. 154(b) by 1154 days.

(21) Appl. No.: 11/673,416

(22) Filed: Feb. 9, 2007

(65) Prior Publication Data

US 2008/0003464 A1     Jan. 3, 2008

Related U.S. Application Data

(60) Provisional application No. 60/772,953, filed on Feb. 14, 2006.

(51) Int. Cl.
 *H01M 8/04* (2006.01)
 *H01M 8/00* (2006.01)
(52) U.S. Cl. .......................... 429/428; 429/452
(58) Field of Classification Search ........... 429/428–516
 See application file for complete search history.

(56) References Cited

U.S. PATENT DOCUMENTS

| 2002/0098396 A1 | 7/2002 | Kobayashi et al. |
| 2004/0131903 A1 | 7/2004 | Shioya |
| 2004/0157111 A1 | 8/2004 | Sakamoto et al. |
| 2006/0068239 A1 | 3/2006 | Norimatsu et al. |
| 2006/0228599 A1 | 10/2006 | Takaiwa |
| 2007/0178335 A1* | 8/2007 | Zimmermann ................ 429/12 |

FOREIGN PATENT DOCUMENTS

| DE | 20205728 U1 * | 7/2002 |
| DE | 20205728 | 8/2002 |
| EP | 1331680 A2 | 7/2003 |
| EP | 1653148 A1 | 5/2006 |
| GB | 2403588 | 1/2005 |
| JP | 2004-311041 A | 11/2004 |
| WO | WO-2005/038973 A1 | 4/2005 |

OTHER PUBLICATIONS

European Patent Office (EPO) office action dated Jun. 30, 2008.*
Machine translation of portions of DE 202 05 728 U1.*
"Preliminary Data Sheet: A2 Fuel Cell Flashlight", Angstrom Power Inc., 2006. Accessed on: Sep. 11, 2010. Website: www.angstrompower.com.*
"European Application No. 01102165.3 Partial European Search Report", (May 30, 2007), 4 pgs.

(Continued)

*Primary Examiner* — Dah-Wei D Yuan
*Assistant Examiner* — Edu E Enin-Okut
(74) *Attorney, Agent, or Firm* — Schwegman, Lundberg & Woessner, P.A.

(57) ABSTRACT

A fuel cell device including a fuel cell flashlight having a modular, interchangeable head portion. Additional modular head portions include circuitry connected with a connector in the head portion. The connector includes a USB type connector and the fuel cell device is suitable for charging other devices such as cell phones, PDAs, digital audio players, and the like.

15 Claims, 9 Drawing Sheets

OTHER PUBLICATIONS

"Fuel Cells for Portable Use", *Zentrum fur Sonnenenergie-und-Wasserstoff-Forschung (ZSW)*, Ulm, Germany, http://www.solarserver.de/solarmagazin/artikeloktober2001-e.html; http://www.zsw-bw.de/en/docs/products/pdfs/ECW_BZsys_en.pdf, (Oct. 2001), 1 page.

McLean, Gerard F., "Conformable Fuel Cells", U.S. Appl. No. 11/875,755, filed Jul. 22, 2005.

"Canadian Application Serial No. 2577655, Office Action mailed Feb. 24, 2009", 3 pgs.

"Canadian Application Serial No. 2577655, Response filed Aug. 7, 2009 to Official Action mailed Feb. 24, 2009", 9 pgs.

"Chinese Application Serial No. 200710080178.1, First Office Action mailed Jun. 6, 2008", (English Translation), 6 pgs.

"Chinese Application Serial No. 200710080178.1, Response filed Oct. 21, 2008 to First Office Action mailed Jun. 6, 2008", 8 pgs.

"Chinese Application Serial No. 200710080178.1, Second Office Action mailed Dec. 19, 2008", (English Translation), 5 pgs.

"Chinese Application Serial No. 200710080178.1, Response filed Mar. 3, 2009 to Second Office Action mailed Dec. 19, 2008", (w/ English Translation of Amended Claims, 5 pgs.

"European Application Serial No. 07102165.3, Communication and European Search Report mailed Jun. 30, 2008", 11 pgs.

"European Application Serial No. 07102165.3, Response filed Oct. 22, 2008 to Communication dated Jun. 30, 2008", 5 pgs.

"European Application Serial No. 07102165.3, Communication mailed Feb. 24, 2010", 4 pgs.

"Canadian Application Serial No. 2,577,655, Notice of Allowance mailed Jun. 22, 2010", 1 Pg.

"Europen Application Serial No. 07102165.3 , Response filed Aug. 27, 2010 to Communication mailed Feb. 24, 2010", 7 pgs.

"Japanese Application Serial No. 2007-030522, Office Action mailed Sep. 14, 2010", (w/ English Translation), 10 pgs.

"Japanese Application Serial No. 2007-030522, Response filed Dec. 13, 2010 to Office Action dated Sep. 14, 2010", (w/ English Translation of Claims), 15 pgs.

* cited by examiner

FUEL CELL DEVICES AND METHOD THEREFOR

PRIORITY OF INVENTION

This non-provisional application claims the benefit of priority under 35 U.S.C. §119(e) to U.S. Provisional Patent Application Ser. No. 60/772,953, filed Feb. 14, 2006, which is herein incorporated by reference.

TECHNICAL FIELD

Devices powered by fuel cells, and more particularly devices powered by fuel cells with interchangeable heads.

TECHNICAL BACKGROUND

Several people rely on many portable devices, such as cell phones or digital audio players. These devices typically require the use of batteries, and the batteries must either be replaced or recharged on a regular basis. Batteries typically do not last as long as users would like. Furthermore, the voltage output of batteries tend to decay as they are used up, resulting in reduced output from devices, such as flash lights.

In LED (light emitting diode) flashlights, change in battery voltage is a problem because the LED is bright to start with but the brightness rapidly drops off as the battery voltage decreases. LED flashlights powered by batteries, such as alkaline batteries, typically have a long "tail" period when the light output is low. The battery capacity is wasted because the light output drops below a given "usable" threshold. For example, the low output must be endured or the batteries must be prematurely discarded. The resulting volumetric energy density of these alkaline-battery-based flashlights is often very low. While rechargeable batteries can be used, rechargeable batteries can have a high self-discharge rate, meaning that the batteries discharge over time regardless of whether the flashlight is turned on or not. When the user wants to use the flashlight, the flashlight may not work if the rechargeable battery has not been recently recharged or if the self-discharge rate is high. This is at best an inconvenience but could be a life or death problem in an emergency situation. Furthermore, rechargeable batteries have limited cycle life. As the number of recharging cycles increase, battery capacity decreases. This can be frustrating for the user because run time of the flashlight will decrease. Replacing custom rechargeable batteries can also be expensive.

SUMMARY

Embodiments include a fuel cell device. One embodiment includes a fuel cell flashlight having a modular, interchangeable head portion. Additional modular head portions may include circuitry connected with a connector in the head portion. The connector may include a USB (universal serial bus) type connector and the fuel cell device may suitable for charging other devices such as cell phones, PDAs, digital audio players, and the like.

These and other embodiments, aspects, advantages, and features will be set forth in part in the description which follows, and in part will become apparent to those skilled in the art by reference to the following description and referenced drawings or by practice thereof. The aspects, advantages, and features are realized and attained by means of the instrumentalities, procedures, and combinations particularly pointed out in the appended claims and their equivalents.

DESCRIPTION OF THE EMBODIMENTS

The following detailed description includes references to the accompanying drawings, which form a part of the detailed description. The drawings show, by way of illustration, specific embodiments in which the invention may be practiced. These embodiments, which are also referred to herein as "examples" or "options" are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation.

Figure 1:
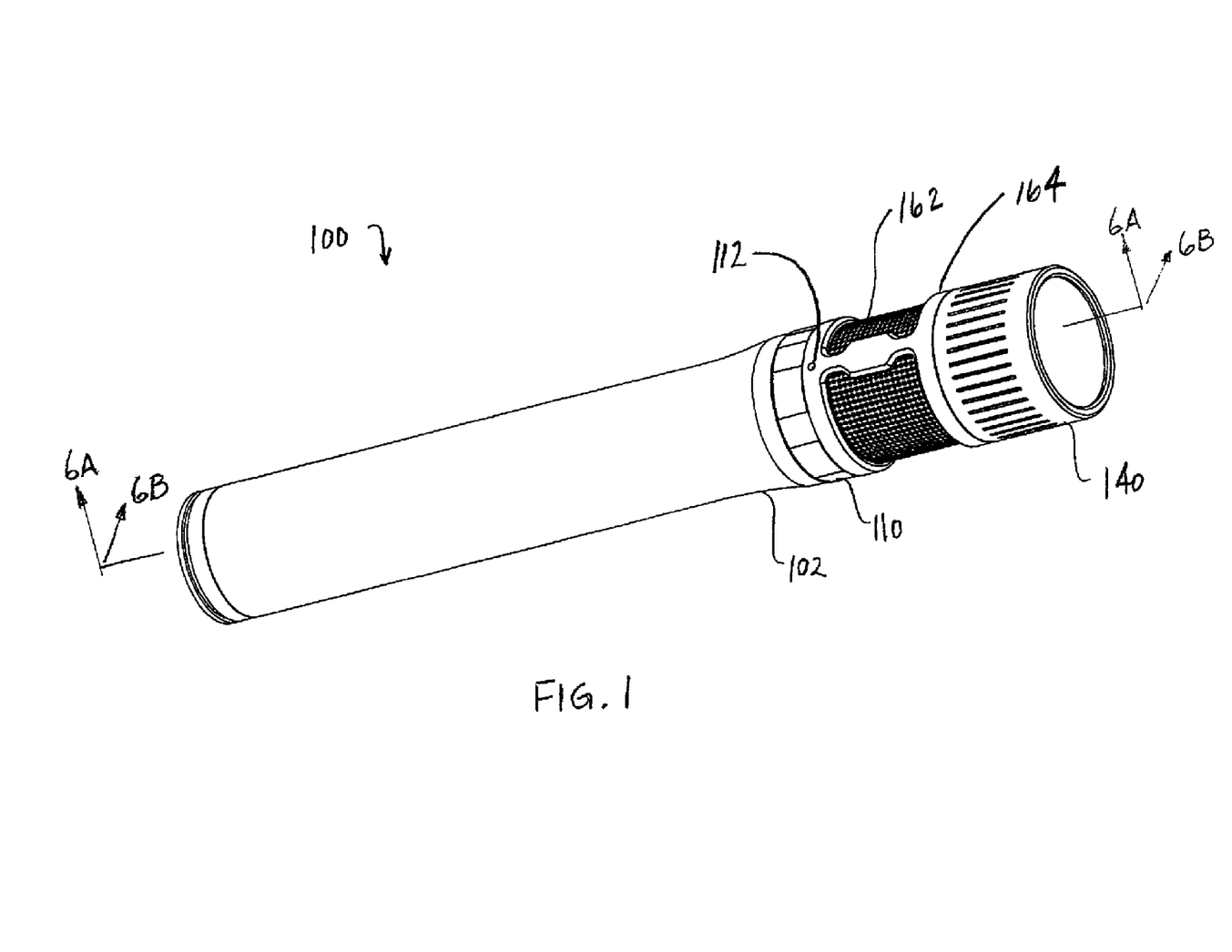
FIG. 1 is a perspective view illustrating a fuel cell device constructed in accordance with at least one embodiment.

FIG. 1 illustrates one example of a fuel cell device 100, a fuel cell flashlight 102, such as an LED (Light Emitting Diode) flashlight. It should be noted that the fuel cell device 100 can include other devices such as, but not limited to, cellular phones, satellite phones, laptop computers, computer accessories, displays, personal audio and/or video players, medical devices, televisions, transmitters, receivers, lighting devices including outdoor lighting, electronic toys, or any device conventionally used with batteries. The fuel cell device 100, such as the fuel cell flashlight 102 includes a handle portion 102, an actuator 110, and a modular head portion 140. The total length of the fuel cell device can be for example 15 cm long. It can also be by example from 1 cm to 40 cm long, or have a volume from about 1 cc to 250 cc. In another example, the fuel cell device 100 can have a volume of about 120 cc.

Figure 3:
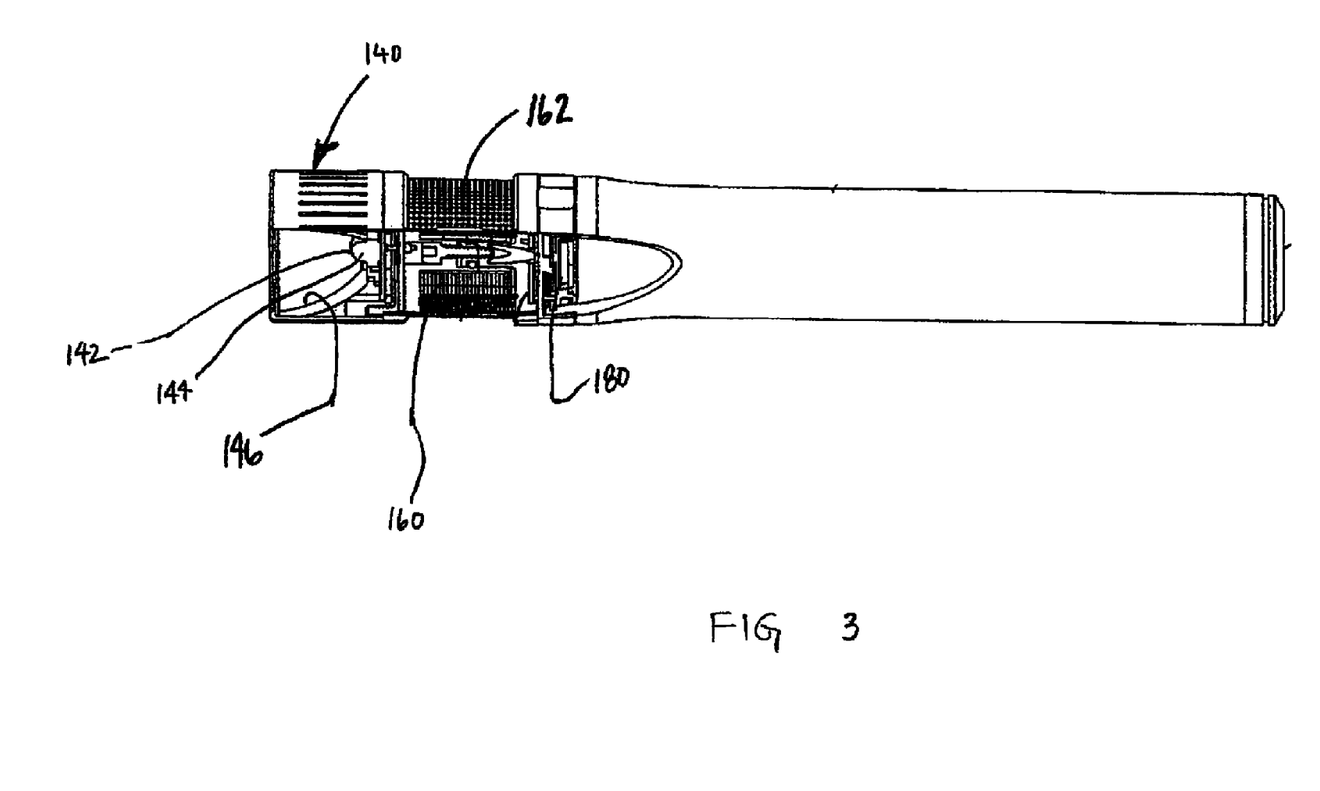
FIG. 3 is a partial cut—away side view of a portion of a fuel cell assembly and a refueling fixture constructed in accordance with at least one embodiment.
Figure 8:
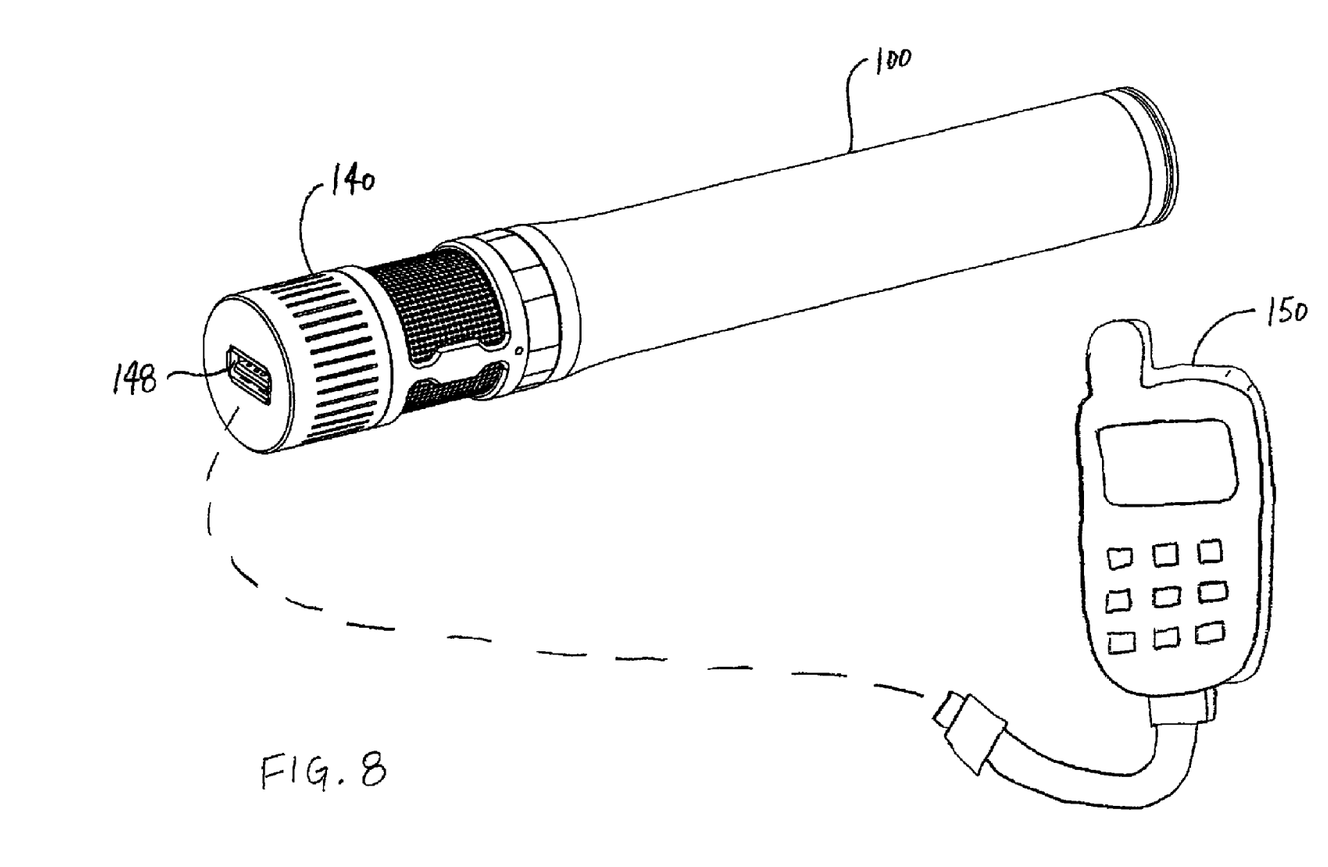
FIG. 8 illustrates a perspective view illustrating a fuel cell device and an external device constructed in accordance with at least one embodiment.

Referring to FIG. 3, the head portion 140, in an example, includes light source 142 (i.e. light producing component) that produces a light output, such as an LED emitter 144 and an optional reflector 146. In an option, the head portion 140 is removable and can be replaced by another head portion 140 with a similar function, or a head portion 140 with a different function. For example, FIG. 8 illustrates a fuel cell device 100 with a modular head portion 140 that includes power conditioning circuitry and a connector 148 therein, and provides power to external devices through the connector 148. In an example, connector 148 is a USB (Universal Serial Bus) connector that provides a 5-volt output. The modular head portion 140 can be used to connect the fuel cell device 100 with other components, and allow the fuel cell device 100 to charge a portable device such as, but not limited to, a cell phone 150, PDA, or any rechargeable device without need from grid power or a generator. Other types of modular heads can be provided such as heads that provide the utility of other devices such as, but not limited to, a laser pointer, a fan, a strobe light, a music player, or any other portable devices that use electrical power. Referring to FIG. 3, the head portion 140 is powered by one or more fuel cells 160 of the fuel cell device 100.

The one or more fuel cells 160 are each adapted to generate electricity. If a plurality of fuel cells is used, they can be connected in parallel, or in series, or in some combination of these. In an example, the one or more fuel cells are arranged radially underneath a grill 162. The number of fuel cells that can be used is from 1 to 50,000 fuel cells. In an example, twenty fuel cells are used to power a Luxeon LED emitter, available from LumiLED Lighting of San Jose, Calif. Many layers of micro-sized fuel cells can also be connected to make a fuel cell device.

Examples of fuel cells include, but are not limited to, a hydrogen fuel cell, a direct methanol fuel cell, a reformed methanol fuel cell, a solid oxide fuel cell, an alkaline fuel cell, a polymer electrolyte membrane fuel cell, a proton exchange membrane fuel cell, or combinations of these. In another example fuel cell, an electrochemical cell is formed on a substrate, such as a pleated substrate. For instance, a sheet of substrate material is corrugated. First and second troughs are defined on opposed faces of the substrate material. Ion-conducting regions are located in a common wall of the first and second troughs. In the ion-conducting regions ions can pass through the substrate material between the first and second troughs.

In a further example of a fuel cell, an electrochemical cell, or fuel cell, has current-carrying structures underlying reaction layers. For instance, a core assembly includes an ion exchange membrane, an electrically conducting electrochemical reaction layer on at least a first side of the ion exchange membrane, and, an electrically-conductive current-carrying structure in electrical contact with the electrochemical reaction layer. An outer surface of the electrochemical reaction layer overlies at least a portion of the current-carrying structure. In yet another option, a thin layer cell structure comprising an ion exchange membrane having an electrochemical reaction layer on each side thereof. The ion exchange membrane can include a layer of unitary construction, or can include a composite layer made up of more than one material. An electrical current-carrying structure at least in part underlies one of the electrochemical reaction layers.

In yet another example of a fuel cell, a fuel cell includes at least two unit reactors that are disposed adjacent to each other to form front and back sides of the compact fuel cell. The fuel cell further includes a front reactant plenum communicating with the front side and a back reactant plenum communicating with the back side. At least one of the reactant plenums includes a reactant.

The unit reactors include a front cavity between front and back process layers, a back cavity between back and front process layers of adjacent unit reactors, where the process layers facilitate transport processes between reactant plenums. The unit reactors further include a front perimeter barrier disposed on the back process layer and substantially surrounding the back cavity, and a back perimeter barrier disposed on the front process layer substantially surrounding the front cavity. Each cavity communicates with a respective side of the fuel cell. At least one of the unit reactors include at least one frame formed from one of the process layers, at least one of the perimeter barriers, and at least one of the cavities.

Figure 2:
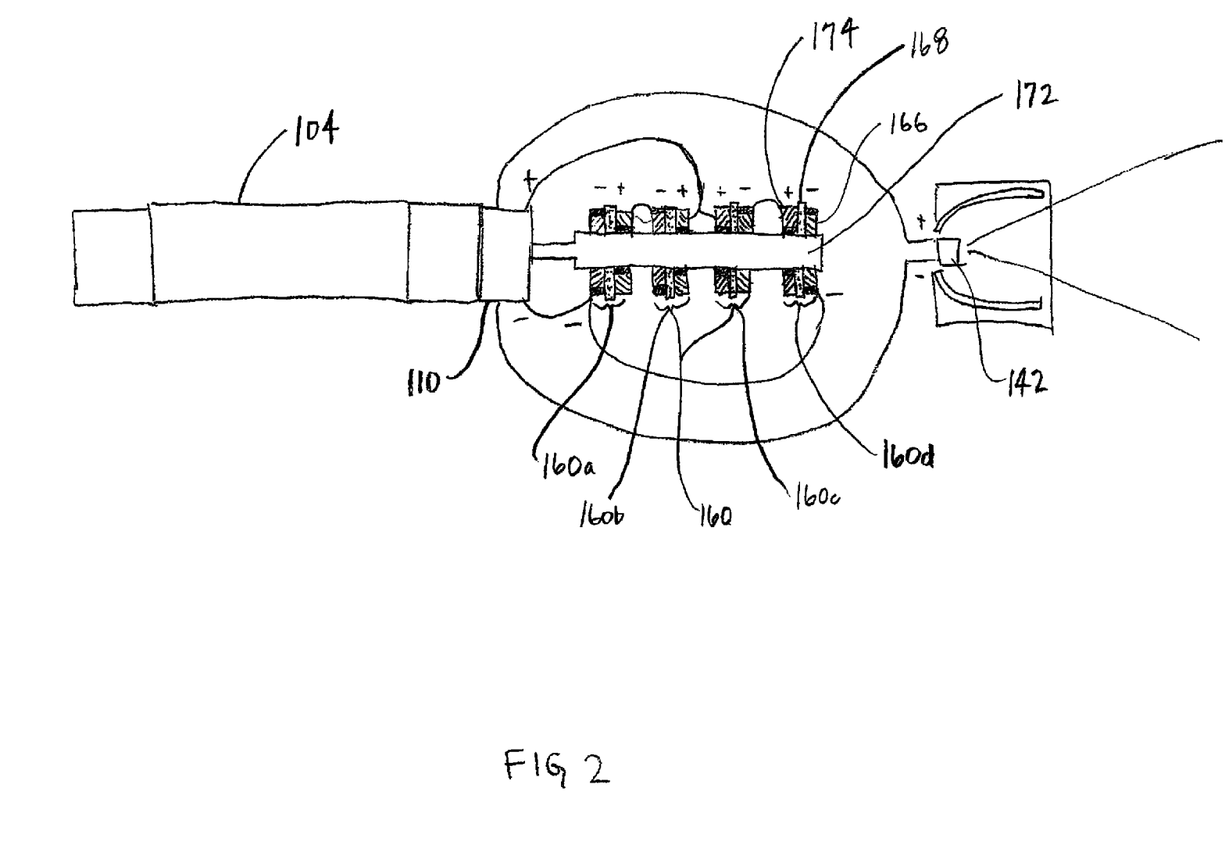
FIG. 2 is a schematic diagram illustrating a unit fuel cell constructed in accordance with at least one embodiment.

Referring to FIG. 2, the one or more fuel cells include a fuel plenum 172 containing fuel, which is sourced from the fuel container 104. The fuel container 104 optionally contains hydrogen in a hydrogen storage medium such as metal hydride. Other fuels can be stored and other fuel storage media can be used, or not at all, if for example hydrogen gas is stored in compressed form. A metal hydride such as Lanthanum Nickel available from Alfa Aesar of Ward Hill, Mass. can be used to store hydrogen. Other metal hydrides are possible. The fuel container 104 is optionally used as the handle portion 102 (FIG. 1). Other fuels and fuel containing materials are also possible, such as but not limited to: methanol, formic acid, butane, chemical hydrides, borohydride compounds, hydrogen stored in a carbon-based storage material (i.e., carbon nanotubes, carbon nanofibres, activated carbon, etc.), compressed hydrogen, or liquid hydrogen.

In an example, each fuel cell 160 includes an anode 166 in communication with or connected to the fuel plenum 172, and each fuel cell 150 further includes a cathode 174 in communication with an oxidant. In an example, oxygen in the ambient air is used as oxidant for the electrochemical reaction in the one or more fuel cells 160. One example of allowing communication of ambient air with the one or more fuel cells 160 is to provide a porous member over the fuel cells 160, such as a perforated grill 162 (FIG. 3). The grill 162 protects the fuel cells 160, and further allows for oxygen in ambient air to access the one or more fuel cells 160, where the oxygen acts as an oxidant for the one or more fuel cells 160. In a further option, a cover 164 (FIG. 1), such as a plastic cover, is disposed over a seam, if any, of the porous member.

Referring again to the fuel cells 160, an electrolyte 168 providing ion exchange capacity separates the anode and the cathode. Non-limiting examples of electrolytes include an ion conducting membrane or a liquid electrolyte. Another example of electrolyte 168 includes a polymer exchange member, such as an ion conducting membrane, which is available under the name of Nafion™, from E.I. Dupont Company of Wilmington, Del.

In an example shown in FIG. 2, the fuel cells 160a, 160b, 160c, 160d are shown with a parallel connection between two sets of two fuel cells connected in series. One fuel cell 160a is connected in series to another fuel cell 160b. A third fuel cell 160c is connected in series to a fourth fuel cell 160d. Different numbers of fuel cells are possible and other parallel and serial combinations are possible to give different voltages and current outputs. In another embodiment, all of the fuel cells are connected in parallel, and in another embodiment all of the fuel cells are connected in series. In yet another embodiment, the fuel cells are connected in parallel and/or in series. In yet a further option, a parallel-serial fuel cell stack is divided into sub-stacks. In a first sub-stack, unit cells are oriented with their cathodes toward a first end plate. In a second sub stack, unit cells are oriented with their cathodes toward a second end plate. The first and second sub-stacks are arranged back-to-back. The electrical polarities of the unit cells in the first and second sub-stacks are oriented in opposite directions.

In an option, a negative connection connects the anode of at least one of the fuel cells 160 to actuator 110. A positive connection connects at least one of the cathodes of the fuel cells to the actuator 110, and the actuator 110 optionally has an electrical disconnect. In addition, in the illustrated example, a positive connection and a negative connection connect a device to be powered, such as a light producing component or a light source, with the actuator 110. In this example, the components are arranged with the axis of the fuel cells 106 parallel to the main axis of a cylindrical fuel tank 104 and a rotary actuator 110.

The actuator 110 is operatively coupled with a shut off feature that turns off power to the head portion 140. For example, the actuator 110 can break the electrical connection to the head portion 140. In another option, the actuator 110 can cut off the fuel supply to the one or more fuel cells 160, for example, by turning off the pressure regulator 180. There can also be a shut off feature such as a valve operated by the actuator 110 that shuts off the flow of fuel from the fuel container 104 to the anode when the unit is not in use. Such a feature can help to extend the shelf life of the fuel cell device.

In addition to providing a shutoff between the fuel container 104 and the one or more fuel cells 160, the actuator 110 also optionally provides an electrical disconnect to break the electrical connection between the one or more fuel cells 160 and a load connected to the one or more fuel cells 160, for instance a feature to be powered, such as the LED 144. In an example, the actuator has two positions, such as ON and OFF. In another example, the actuator 110 has at least three distinct positions: ON, OFF, and STANDBY. In an option, the actuator 110 is physically moved, for example by rotation, to move the actuator between the various settings. In the ON position, both fuel is allowed to flow to the one or more fuel cells 160, and electricity is provided to the feature to be powered, such as the LED 144. In the OFF position, the supply of both fuel and electricity is disconnected from the respective components. The STANDBY setting is located between the ON and the OFF settings, and in the STANDBY setting, the fuel connection between the one or more fuel cells 160 and the fuel container 104 is open, but the electrical connection is broken. Optionally, a visual indicator is provided with the fuel cell device 100, such as markings on the housing, or an indicator LED 112 (FIG. 1) providing the user with visual feedback when the actuator 110 is in the STANDBY position.

Figure 4A:
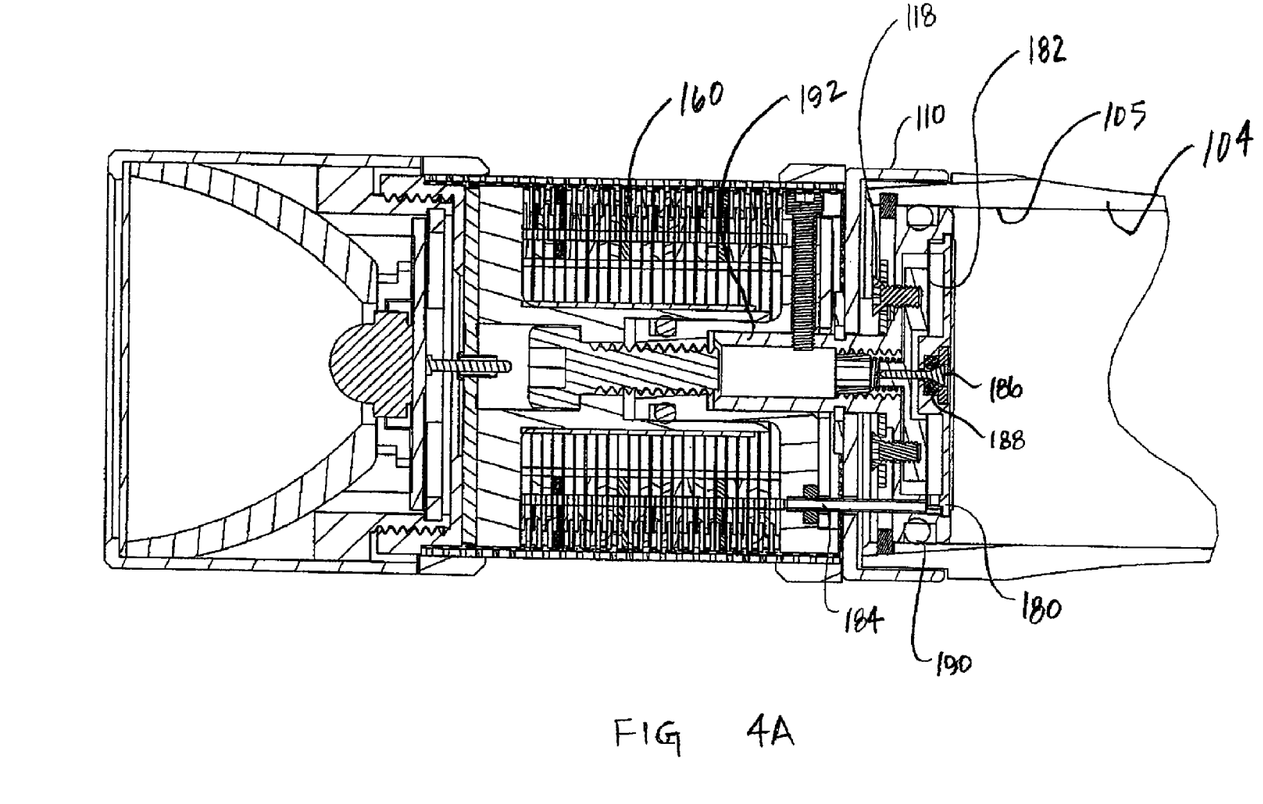
FIG. 4A is a cross-sectional view of a portion of a fuel cell device constructed in accordance with at least one embodiment.
Figure 4B:
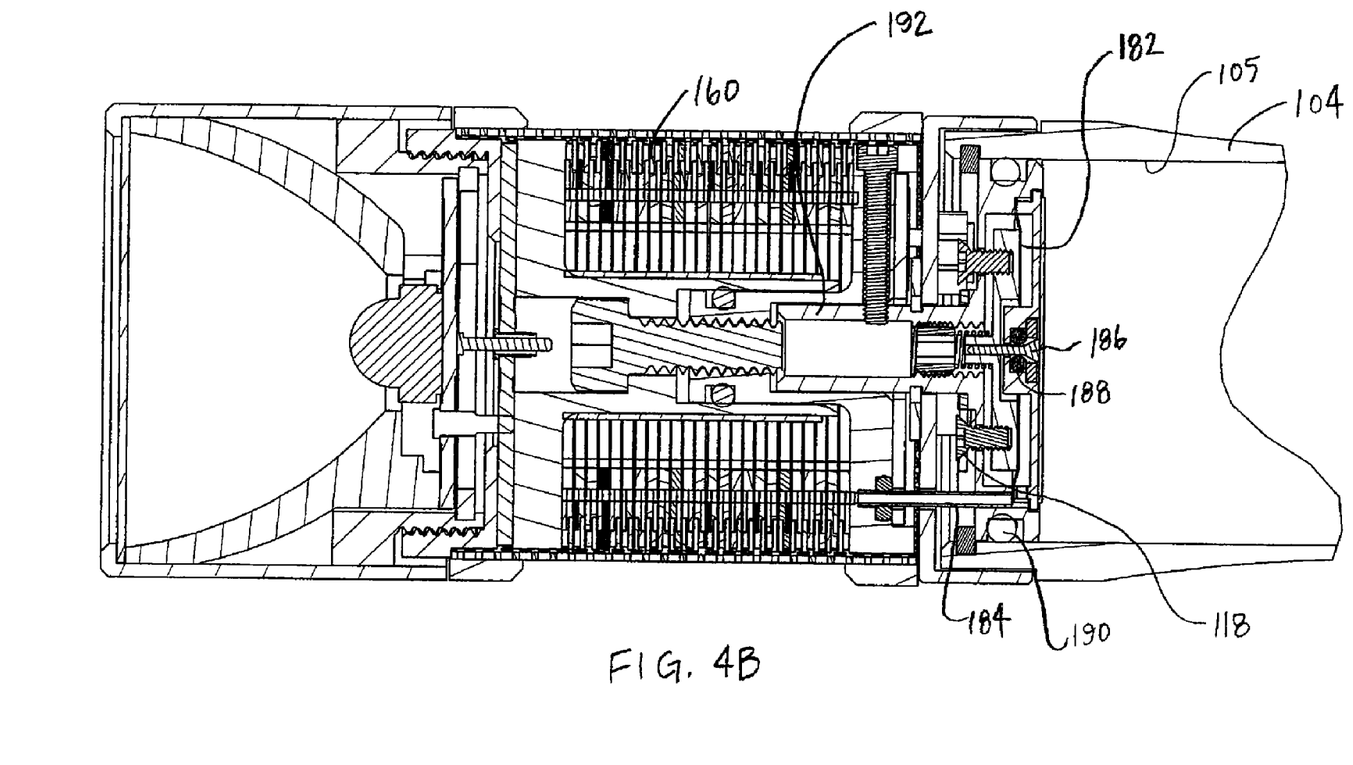
FIG. 4B is a cross-sectional view of a portion of a fuel cell device constructed in accordance with at least one embodiment.
Figure 5:
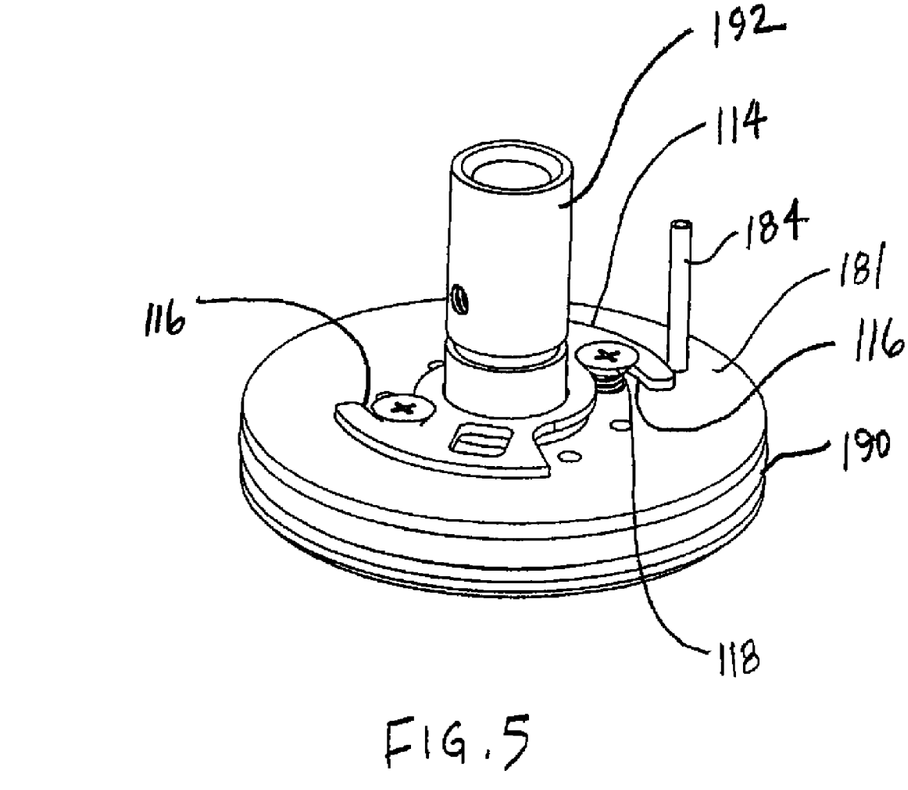
FIG. 5 is a perspective view of a switch mechanism of the fuel cell device constructed in accordance with at least one embodiment.
Figure 6A:
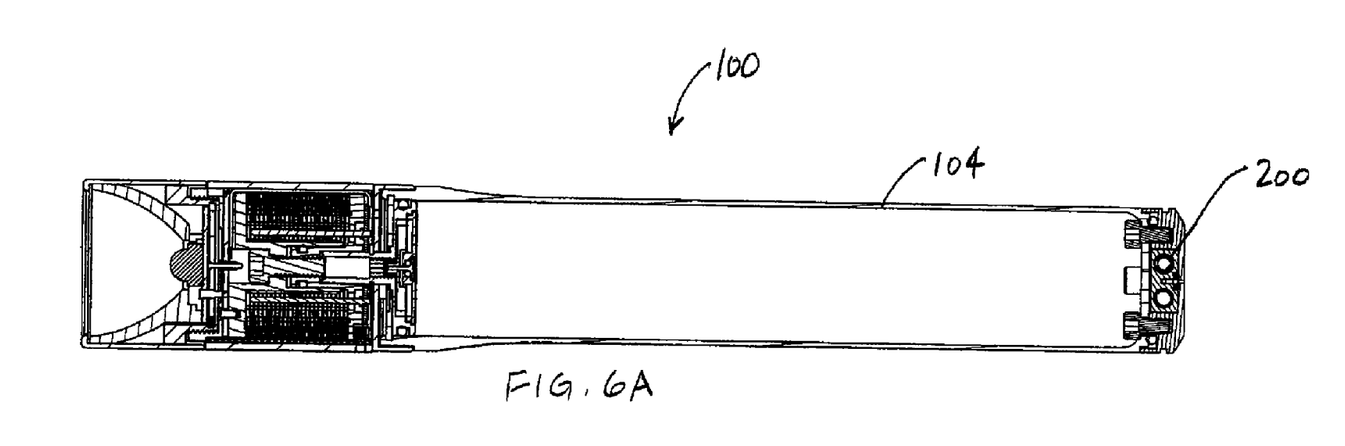
FIG. 6A is a cross-sectional view taken along 6A-6A of FIG. 1.
Figure 6B:
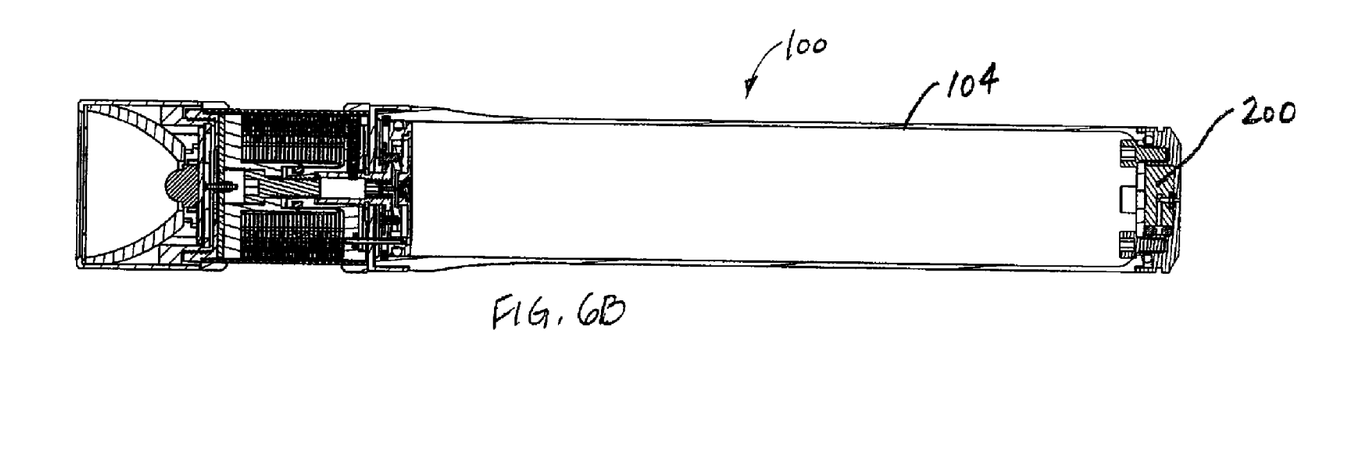
FIG. 6B is a cross-sectional view taken along 6A-6A of FIG. 1.
Figure 7A:
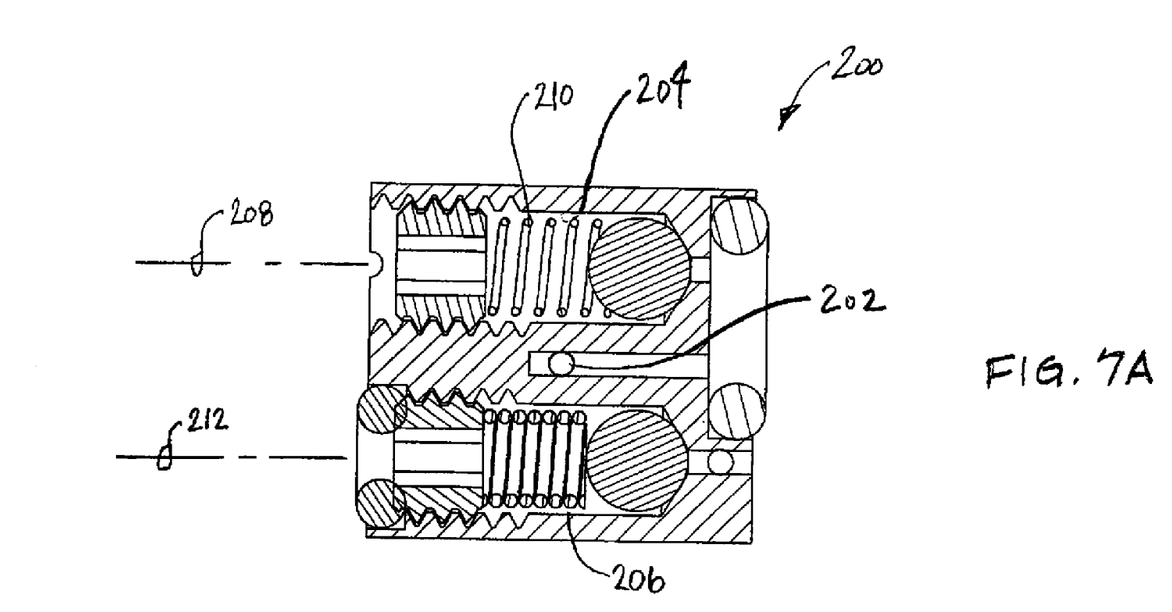
FIG. 7A is a cross-sectional view of a refueling port of the fuel cell device constructed in accordance with at least one embodiment.
Figure 7B:
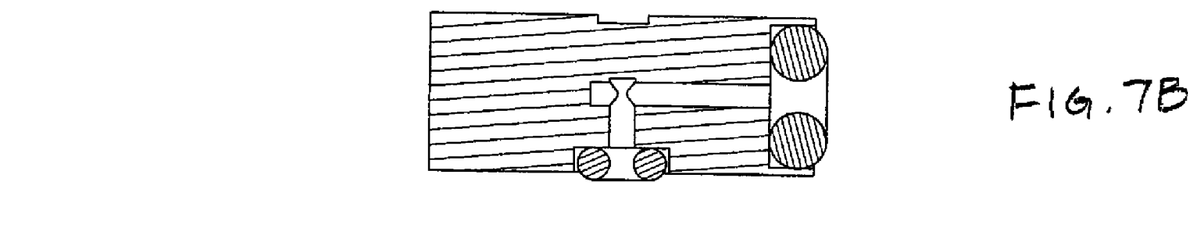
FIG. 7B is a cross-sectional view of a refueling port of the fuel cell device constructed in accordance with at least one embodiment.

The actuator 110 can be operatively coupled with the pressure regulator 180, as illustrated in FIGS. 4A and 4B. The pressure regulator 180 regulates the pressure of the fuel, for example, the hydrogen gas pressure from the hydride, down to a suitable pressure for the one or more fuel cells 160. For example, the pressure regulator could regulate pressures up to 200 psi down to a pressure of approximately 0.5 to 15 psi. FIGS. 4A, 4B, and 5 show a general view of a mechanism for connecting the actuator 110 to the pressure regulator 180 according to an embodiment of the fuel cell device 110, where FIG. 4A shows the pressure regulator 180 (and actuator 110) in the closed position, and FIG. 4B shows the pressure regulator 180 in the open position.

The mechanism includes a disk 114 that has one or more grooves 116 therein. The disk 114 is coupled with the actuator 110 such that when the actuator 110 is moved, for instance by rotation, the disk 114 is rotated or otherwise moved. Flanged members 118, such as screws, are mechanically coupled to a pressure regulator diaphragm 181. The flanged members 118 allow for shutting the regulator valve off and adjustment to the shut off position. The flanged members 118 are received within the grooves 116, and are positioned relative to the disk 114 such that the disk 181 has a first longitudinal position when the flanged member 118 are engaged within the grooves 116, such as shown in FIG. 4A, and the disk 181 has a second longitudinal position when the flanged member 118 is not engaged within the grooves 116, as shown in FIG. 4B.

The flanged members 118 can be set so the pressure regulator 180 is shut off when the actuator 110 is in the correct position. When the actuator 110 is in the ON or STANDBY setting, the pressure regulator 180 regulates the pressure of the fuel fed to the one or more fuel cells 160 through conduit 184. When the actuator 110 is in the OFF setting, The disk 114 connected to the actuator 110 shuts off the pressure regulator by lifting the regulator diaphragm 182 up via the flanged members 118, and the pin 186 seals against an O-ring 188 to shut off flow of hydrogen gas from the fuel container 104 to the one or more fuel cells 160.

The pressure regulator 180 is generally disposed between the one or more fuel cells 160 and the fuel container 104, in an option. A sealing member, such as an O-ring 190, seals the pressure regulator 180 to the inside wall 105 of the fuel container 104. The one or more fuel cells 160 are mounted on a shaft 192 extending from the pressure regulator 180.

The one or more fuel cells 160 operate through use of fuel that is contained within the fuel container 104. As the fuel in the one or more fuel cells is consumed, refueling must occur for continued use of the fuel cell device. In order to introduce additional fuel into the fuel cell, a refueling assembly 200 is provided, as illustrated in FIGS. 6A, 6B, 7A, and 7B. An inlet port 202 is shown allowing fuel gas to flow through an inlet check valve 204 into the fuel container 104. The refueling assembly 200 is a pressure activated one-way valve that allows a flow of fluid, for example, fluid fuel, into the fuel container 104. The flow of fuel is allowed into the fuel container 104 during refueling, but does not allow fuel to flow back out of the fuel reservoir.

A pressure relief valve 206 allows fuel gas to flow from the inside of the fuel container 104 to the outside environment should the pressure build up too high in the fuel container 104. In an option, the axis 208 of a resilient member, such as a spring 210, in the inlet check valve 204 is aligned approximately perpendicularly to the axis of the fuel container 104, which is oriented in and out of the page. The axis 212 of the pressure relief valve 206 is also aligned approximately perpendicularly to the axis of the fuel container 104, which is oriented in and out of the page.

Advantageously, the fuel cell flashlight has a relatively long run time, and allows for higher brightness levels without substantially reducing run time. A further advantage is that the fuel cell flashlight provides a constant light output as long as fuel is supplied, providing a longer usable light run time, without requiring use of a DC-DC converter. This is particularly helpful for LED flashlights, which can otherwise be sensitive to voltage output levels. The fuel cell flashlight further provides for a more economical approach to powering the flashlight, as opposed to constantly replacing batteries. The fuel cell further provides the ability to handle many refueling cycles without impacting flashlight run time, delivering longer run times for many refueling cycles.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A fuel cell device comprising:
   one or more fuel cells adapted to generate electricity, wherein the one or more fuel cells includes an anode, a cathode, and an electrolyte separating the anode and cathode, the electrolyte providing an ion exchange membrane;
   a fuel supply coupled with the one or more fuel cells, the fuel supply containing a metal hydride material;
   an actuator operatively coupled with the fuel supply and the one or more fuel cells; and
   the actuator having an ON setting and an OFF setting, in the OFF setting the fuel supply is prevented from supplying fuel to the one or more fuel cells; and
   a first modular head portion having a first function, the first modular head portion operatively coupled with the one or more fuel cells, the first modular head portion includes electronic circuitry and an external connector, the electronic circuitry coupled with the external connector, the external connector connectable with external devices.

2. The fuel cell device as recited in claim 1, further comprising a second modular head, the second modular head including a load connected to the one or more fuel cells.

3. The fuel cell device as recited in claim 2, wherein the load is a light producing component.

4. The fuel cell device as recited in claim 3, wherein the light producing component is a LED (light emitting diode).

5. The fuel cell device as recited in claim 1, wherein the actuator actuates an electrical disconnect between the fuel cells and an electrical load.

6. The fuel cell device as recited in claim 1, wherein the actuator further comprises a STANDBY setting in which a fuel valve is open and an electrical connection between the one or more fuel cells and a modular head portion is broken.

7. The fuel cell device as recited in claim 6, further comprising a visual indicator, the visual indicator providing an indication of when the actuator is in the STANDBY setting.

8. The fuel cell device as recited in claim 1, further comprising a fuel container having fuel therein, wherein the fuel is hydrogen gas.

9. The fuel cell device as recited in claim 8, wherein the hydrogen gas is stored in a metal hydride material.

10. The fuel cell device as recited in claim 1, wherein the modular head includes a connector couplable with an external device, and the one or more fuel cells charge the external device via the connector.

11. The fuel cell device as recited in claim 1, wherein the external connector is a USB connector.

12. The fuel cell device as recited in claim 1, further comprising a refueling port.

13. The fuel cell device as recited in claim 1, further comprising a device handle, wherein the device handle includes a fuel container therein.

14. The fuel cell device as recited in claim 1, further comprising a pressure regulator to regulate the delivery pressure of stored fuel to a fuel plenum in communication with the one or more fuel cells.

15. The fuel cell device as recited in claim 1, wherein the fuel cells are arranged radially around a diameter of the device.

* * * * *

UNITED STATES PATENT AND TRADEMARK OFFICE
CERTIFICATE OF CORRECTION

PATENT NO. : 7,964,313 B2
APPLICATION NO. : 11/673416
DATED : June 21, 2011
INVENTOR(S) : Jean-Louis Iaconis et al.

It is certified that error appears in the above-identified patent and that said Letters Patent is hereby corrected as shown below:

On the Title page, in field (54), in "Title", in column 1, lines 1-2, delete "FUEL CELL DEVICES AND METHOD THEREFOR" and insert -- FUEL CELL DEVICE WITH MODULAR HEAD --, therefor.

Title page 2, under "Other Publications", in column 1, line 7, delete "11/875,755," and insert -- 11/185,755, --, therefor.

Title page 2, under "Other Publications", in column 5, line 11, delete "Jun." and insert -- Jul. --, therefor.

In column 1, lines 1-2, delete "FUEL CELL DEVICES AND METHOD THEREFOR" and insert -- FUEL CELL DEVICE WITH MODULAR HEAD --, therefor.

Signed and Sealed this
Eighth Day of May, 2012

David J. Kappos
*Director of the United States Patent and Trademark Office*